(12) United States Patent
Bouraoui et al.

(10) Patent No.: US 6,473,848 B2
(45) Date of Patent: Oct. 29, 2002

(54) METHOD FOR CONTROLLING MEMORY ACCESS ON A MACHINE WITH NON-UNIFORM MEMORY ACCESS AND MACHINE FOR IMPLEMENTING SUCH A METHOD

(75) Inventors: Nadia Bouraoui, Eybens (FR); Jean-Pascal Mazzilli, Eybens (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/243,119

(22) Filed: Feb. 3, 1999

(65) Prior Publication Data

US 2002/0062432 A1 May 23, 2002

(30) Foreign Application Priority Data

Feb. 12, 1998 (FR) .............................................. 98 01701

(51) Int. Cl.⁷ .......................... G06F 12/08; G06F 12/10; G06F 12/12
(52) U.S. Cl. ........................................ 711/206; 711/203
(58) Field of Search ................................. 711/202, 203, 711/206; 713/2

(56) References Cited

U.S. PATENT DOCUMENTS 5,787,476 A * 7/1998 Laudon et al. ............... 711/141
5,897,664 A * 4/1999 Nesheim et al. ............. 711/206
6,105,053 A * 8/2000 Kimmel et al. .............. 709/105

FOREIGN PATENT DOCUMENTS

| EP | 0 690 384 | | 1/1996 | |
|----|-----------|---|--------|---|
| GB | 2297402 | * | 7/1996 | .......... G06F/11/34 |
| WO | WO99/12099 | | 3/1999 | |

* cited by examiner

Primary Examiner—Matthew Kim
Assistant Examiner—Pierre M. Vital
(74) Attorney, Agent, or Firm—Miles & Stockbridge P.C.; Edward J. Kondracki

(57) ABSTRACT

On a machine with non-uniform memory access distributed over several modules, each module includes one or more processors for executing tasks on a virtual or physical addressing space by effective addresses generating logical page numbers to which it is possible to make physical page numbers correspond in the memory by a correlation tale. The generation of a logical page number causes a first-level page-fault type exception when the logical page number is absent from the correlation table. The method includes a step for activating a function (Trace), following each first-level page-fault type exception, a trace function, which records the value of the effective address that has generated the logical page number that has caused the exception, the date when the exception is caused, an identifier of the task using the effective address, an identifier of the processor executing the task and the physical page number corresponding to the logical page number that has caused the exception.

20 Claims, 8 Drawing Sheets

| date (hh:mm:ss.ns) | Pnom | Pid | Tid | CPU | IT | LR | IAR | EA | PPN | SD | Pin |
|---|---|---|---|---|---|---|---|---|---|---|---|
| 11:55:28.367374720 | glbd | 32644 | 20605 | 2 | N | 1a9050 | 1a8f04 | 001a8000 | 1a8 | 0 | N |
| 11:55:28.367396608 | llbd | 31296 | 21885 | 0 | N | 1000cebc | 1000cf00 | 1000c000 | bc27 | 37ed | N |
| 11:55:28.367435776 | funlmxd | 5740 | 8059 | 3 | N | d0133800 | d01333c0 | d0133000 | dc18 | 4411 | Y |
| 11:55:28.367457792 | netlsd | 32984 | 1807 | 2 | N | d002d3c0 | d002d494 | 20048000 | b7bb | 4813 | N |
| 11:55:28.367482880 | glbd | 32644 | 20605 | 1 | N | 1a9050 | 1a8f30 | 0eb27000 | c27f | 0 | N |
| --- | --- | --- | --- | --- | --- | --- | --- | --- | --- | --- | --- |
| --- | --- | --- | --- | --- | --- | --- | --- | --- | --- | --- | --- |
| 11:55:28.367494528 | ksh | 25074 | 21000 | 1 | N | 10004c98 | 10005328 | f01ab000 | b7c1 | d22 | N |
| 11:55:28.367497600 | llbd | 31296 | 21885 | 1 | N | 1000cebc | 1000cf0c | 2000a000 | c053 | 17e5 | N |

FIG. 6

METHOD FOR CONTROLLING MEMORY ACCESS ON A MACHINE WITH NON-UNIFORM MEMORY ACCESS AND MACHINE FOR IMPLEMENTING SUCH A METHOD

FIELD OF THE INVENTION

The invention relates to the field of information technology and, more particularly, to a method for controlling memory access on a machine with non-uniform memory access distributed over several modules and a machine implementing the method.

BACKGROUND OF THE INVENTION

In the field of information technology, it is possible to increase the power of a machine by increasing the number of processors of which it is composed. One type of machine known by the name SMP allows the various processors of the same machine to access its memory symmetrically by means of a system bus. These are machines with uniform memory access in so far as the time to access the memory is substantially the same for all the data accessed. However, the performance curve of such machines does not increase linearly as a function of the number of processors. A high number of processors means that the machine manages more problems of accessibility to its resources than it has resources to execute applications. This has the consequence of considerably distorting the performance curve when the number of processors exceeds an optimal number, often estimated to be of the order of four. The state of the art offers different solutions to this problem.

A known solution consists in grouping several machines in clusters so as to make them communicate together by means of a network. Each machine has an optimal number, for example four processors, and its own operating system. It establishes communication with another machine each time it performs processing of data kept updated by that other machine. The time needed for these communications and the need to work on coherent data pose problems of latency for bulky applications such as distributed applications, which require numerous communications. Latency is the period separating the moment of sending a request to access the memory and the moment when the response to this request is received.

Another known solution is that of NUMA-type machines. These are machines with non-uniform memory access, in so far as the memory access time varies according to the location of the data accessed. A NUMA-type machine is constituted by several modules, each module comprising an optimal number of processors and a physical portion of the total memory of the machine. Such a machine has non-uniform memory access since it is generally easier for a module to access a physical portion of the memory that it does not share with another module than with a portion that it shares. Although each module has a private system bus connecting its processors and its physical memory, an operating system common to all the modules means that all the private system buses can be considered one single system bus of the machine. Logical addressing assigns a place of residence to a given physical memory location in a module. For a processor being considered, a distinction is drawn between accesses to a local portion of memory, physically located on the same module as the processor, and accesses to a remote portion of memory, physically located on one or more modules other than the one where the processor is located.

A particular type of NUMA machine is the CCNUMA type, i.e. the type of machine with what is known as cache coherency. A shared cache mechanism means that, at any given moment, a valid, i.e. updated, copy of this block is not necessarily located in its physical memory location of residence. One or more updated copies of the block can in this way migrate from one module to the other in line with application demands and system calls. The physical memory, located in a module under consideration, is that which the module under consideration accesses most quickly, since it does this directly by means of its local system bus. The physical memory, remote in another module, is the one which the module under consideration accesses least quickly, since it requires one or more transactions between modules. The physical memory, local to the module under consideration, comprises a first portion specially assigned to the data blocks resident in that module, and a second portion specially assigned to copies of blocks resident in other modules. The second portion of physical memory constitutes a remote memory cache in the other modules.

A block resident in the first portion of physical memory is not immediately available if its content does not constitute an updated copy, this is the case, for example, if one or more other modules share this block and if one of these other modules holds an updated copy thereof, in terms of memory coherency. To manage the sharing of blocks resident in its first portion of physical memory with other modules, the module under consideration has a remote cache controller RCC.

The usefulness of machines with non-uniform memory access and cache coherency is that each module works on data blocks resident in a first portion of its local memory or on copies in a second portion of local memory, of blocks resident in a first portion of memory of another module. A module under consideration then needs to communicate with other modules only in order to work on updated copies so as to ensure data coherency. In execution, it is therefore a priori immaterial whether a block of data is resident in one module or another since, if necessary, each module relocates in its local memory copies of blocks that it needs. However, for executing the operating system common to all the modules or certain applications of distributed type, it is possible that certain data may be useful to all the modules. By way of non-exhaustive example, these data concern process allocation tables, open file tables or tables of the setting of locks on shared resources. The coherency of these data is likely to need numerous exchanges between modules and therefore to interfere with the increase of performance expected of such machines.

On the other hand, it is of interest to use a virtual addressing mode in order to get an information processing machine to execute processes. As known in the state of the art, a virtual addressing space is allocated to each process executed by the machine. The virtual addressing machine makes it possible to free itself of the constraints of memory size that can occur in a physical addressing space. The processes and the tasks (otherwise known as threads) within a process access their virtual addressing space by means of effective addresses that generate logical page numbers, to each of which the machine causes a physical page number (otherwise known as a frame) to correspond, this being accessible in physical memory, as actual access needs arise. The virtual memory mechanism is independent of the cache coherency mechanism. However, if a process task is executed on a processor located on a module that is different from the module in the memory of which a physical page, accessed by that task, is resident, the implementation of the cache coherency protocol between modules is likely to slow down memory accesses and impair the performance of the system.

The complexity of the correlation mechanisms and the physical memory requirements of the numerous processes executed by the machine mean that it is difficult to apprehend a priori the distribution of the physical pages over the modules so as to correspond to logical pages.

SUMMARY OF THE INVENTION

The invention proposes a method for controlling memory access on a machine with non-uniform memory access distributed over several modules, each module comprising one or more processors CPU for executing tasks on a virtual or physical addressing space by means of effective addresses EA generating logical page numbers LPN to which it is possible to make physical page numbers PPN correspond in said memory by means of a correlation table LPT, the generation of a logical page number LPN causing a first-level page-fault type exception when said logical page number LPN is absent from the correlation table, characterised in that it comprises a step for activating, following each first-level page-fault type exception, a trace function, which records the value of the effective address EA that has generated the logical page number LPN that has caused said exception, the date when said exception is caused, an identifier of the task using said effective address EA, an identifier of the processor executing said task and the physical page number PPN corresponding to the logical page number that has caused said exception.

The activation of the trace function at each first-level page-fault type exception makes it possible to detect each new first access by a processor to a page of physical memory, whether or not this page is pegged. The identifier of the processor and the physical page number make it possible to know which module is the location of the physical page and the processor. There is good affinity between processor and physical memory if they are located in the same module. The date makes it possible to define the moment when this new first access occurred, it allows the trace results to be correlated between each other or with other results obtained elsewhere. The task identifier makes it possible to know the task to which the memory access is linked and thus to correlate various memory accesses linked to the same task, which can for example be executed on different processes over the course of time. The value of the effective address makes it possible to specify the type of addressing used by the task, the physical page number associated with any one effective address can evolve over the course of time if the physical page is not pegged. In order to communicate, various tasks can use the same effective address.

By starting up the method at the same time as executing processes on the machine, one is sure of detecting all the configurations of access to the physical memory. For starting up the method independently of executing processes on the machine, the invention proposes invalidating all the inputs in the correlation table LPT when starting up the method.

The invention also proposes a machine for implementing the method of controlling memory access, comprising first means for activating a function that introduces a logical page number LPN with a correlation to the physical page number PPN in a correlation table following an exception caused by an absence of valid input containing said logical page number LPN in said correlation table, characterised in that it comprises:

second means to replace the first means by third means, which activate a trace function.

BRIEF DESCRIPTION OF THE DRAWINGS

The invention will be understood more readily with the aid of the description of an embodiment example, with reference to the figures.

FIG. 6 shows a table in accordance with the control method according to the invention.

DESCRIPTION OF THE PREFERRED EMBODIMENTS

Figure 1:
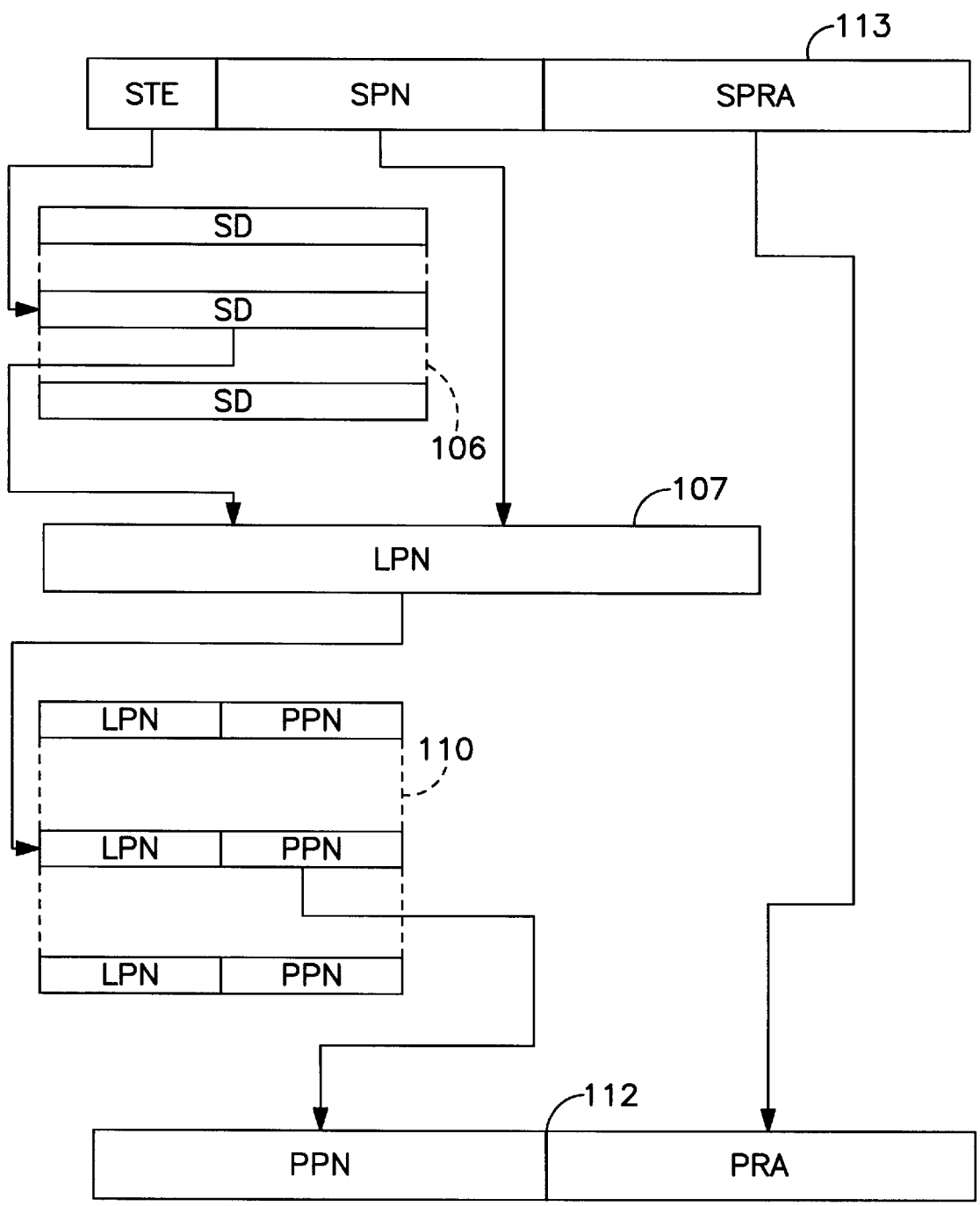
FIG. 1 is a brief summary of the operation of prior art segmented virtual addressing.

FIG. 1 is a brief summary of the operation of segmented virtual addressing, the terms of which may be useful in explaining the invention with reference to the following figures.

The term effective address EA is given to a logical entity 113 essentially comprising three fields STE, SPN and SPRA. The field STE contains a number i of bits for coding a segment table input 106 constituted by $2^i$ registers. For example, the table 106 contains sixteen registers if the value of i is four. Each register is intended to contain a number m of bits for referencing a segment identifier SD. This makes it possible to segment an addressing space into $2^m$ segments of virtual memory. For example, the identifier SD allows sixteen mega-segments to be distinguished if the value of m is twenty-four. The prefix mega should be understood here in the information-technology sense of the term, i.e. equal to one thousand and twenty-four kilo, the kilo itself being equal to one thousand and twenty-four units. The field SPN contains a number j of bits for coding a page number in a segment. A segment can than contain $2^j$ distinct pages of virtual memory, for example sixty-four kilo-pages if the value of j is sixteen. The field SPRA contains a number k of bits for coding a relative byte address, within a page, the byte being the smallest entity of information-technology data, generally eight or nine bits, that is addressable by the system. A page can then contain $2^k$ information-technology bytes, for example four kilobytes if the value of k is twelve.

A concatenation of segment identifier SD and page number SPN gives a logical page number LPN 107. It is then possible to reference $2^{m+j}$ distinct logical pages, i.e. for example one tera-pages if the value of m+j is forty. By addressing the bytes of each page by means of the field SPRA, it is possible to obtain in this way a virtual addressing space of four petabytes, where the prefixes tera and peta should be understood in the information-technology sense of the terms.

A logical page table LPT 110 makes it possible to cause a physical page number PPN to correspond to a given logical page number LPN. By concatenating the physical page number PPN with a relative address PRA in the page referenced in this way, a physical byte address 112 is obtained. The relative address PRA is a direct copy of the field SPRA. If, for example, the physical page number is coded on twenty bits, it is possible to obtain a physical address coded on thirty-two bits in order to access a physical memory of forty megabytes.

Among the various possible mechanisms for operating the table 110, we can cite that of U.S. Pat. No. 4,279,014 of J-C. Cassonnet et al., from which some references in FIG. 1 are intentionally borrowed in the present description with reference to that figure.

Figure 2:
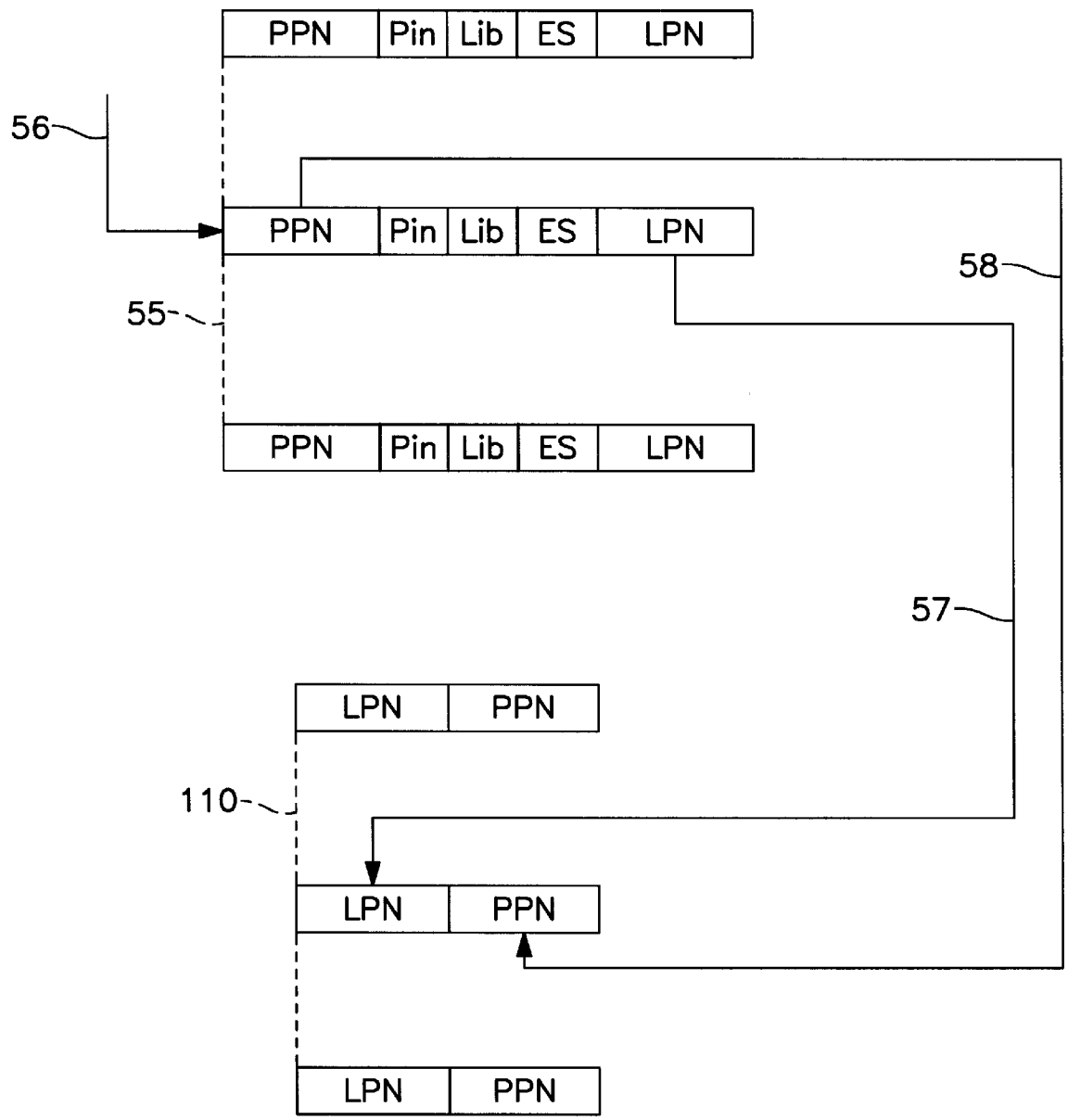
FIG. 2 shows prior art tables of correlation between physical page numbers and logical page numbers.

Virtual addressing makes it possible to obtain an addressing space considerably larger than the available physical addressing space. The person skilled in the art is also aware of other advantages such as that of facilitating the dynamic editing of links when executing programs The considerable size of the virtual addressing space means that at any given moment a logical page numbered LPN is not necessarily referenced in the table LPT. It may be, however, that a physical page numbered PPN exists in the physical memory, capable of corresponding to the logical page numbered LPN. FIG. 2 shows an inverse correlation table PPT 55, each input of which is referenced by a physical page number PPN, so as to cover all the physical addressing space used.

Each input in the table 55 gives access to a logical page number LPN corresponding to the physical page number PPN, and also to a set of properties of the physical page PPN, including for example an indicator Pin, an indicator Lib and an indicator ES. A status Y of the indicator Pin means that the physical page numbered PPN is pegged in physical memory, i.e. it must not be replaced by the content of another physical page. A status N of the indicator Pin means that the physical page numbered PPN is not pegged in physical memory, i.e. it is possible to replace it by the content of another physical page, for example if the physical memory is not large enough to satisfy all the correlations between logical pages and physical pages. A status Y of the indicator Lib means that the physical page numbered PPN is free, i.e. it is available to correspond to a possible logical page with a new number LPN. A status Y of the indicator ES means that the physical page numbered PPN is currently being replaced by means of an input output device communicating with a mass memory and that this physical page is therefore not available.

Figure 3A:
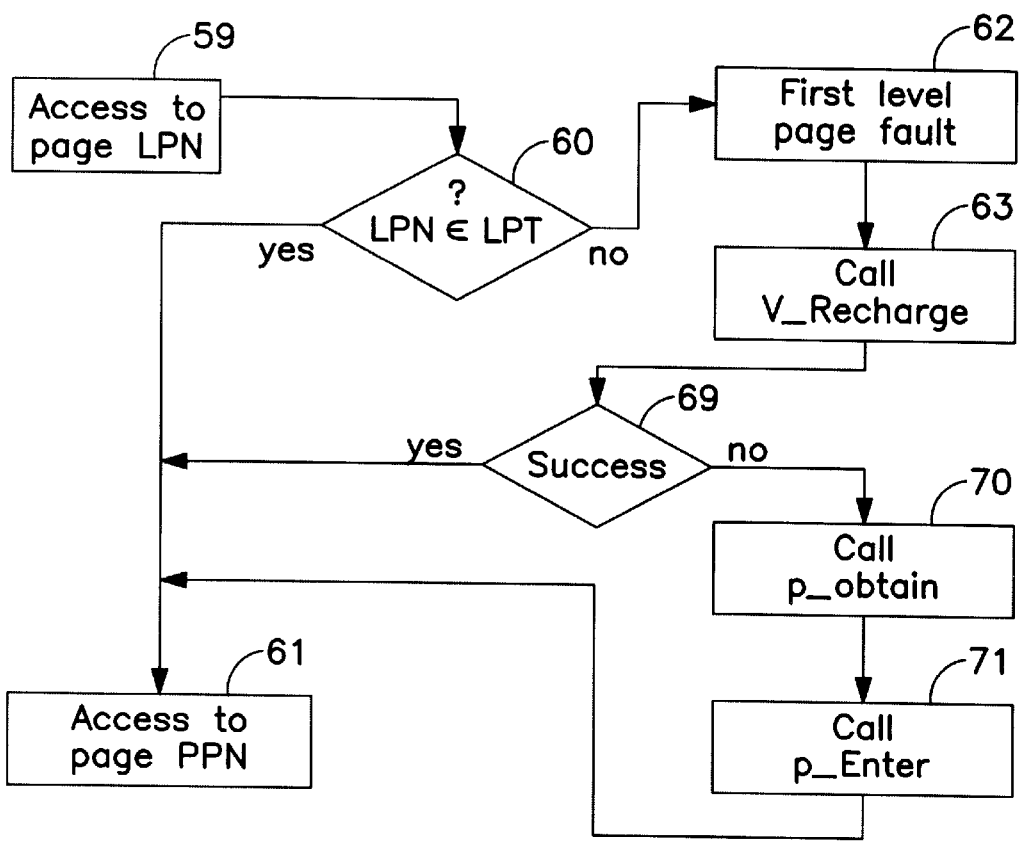
FIG. 3a–3c show various prior art page-fault levels and the main actions resulting therefrom.

FIG. 3a shows how a processor CPU, such as one of those presented subsequently with reference to FIG. 5, accesses a physical page numbered PPN corresponding to the logical page numbered LPN, which it addresses in accordance with the explanations given with reference to FIG. 1. An access to the logical page number LPN at step 59 causes the scanning of the table 110, for example in a mode similar to that explained in U.S. Pat. No. 4,279,014 with reference to its FIG. 3c. If the processor CPU finds, in step 60, a valid input of the table LPT containing the logical page number LPN, it directly accesses the corresponding physical page numbered PPN in step 61. Otherwise the processor CPU causes, in step 62, an exception entitled first-level page fault to signify that the logical page number LPN is absent from the table LPT 110. The exception caused in step 62 has the effect of activating a software function V_Recharge in step 63. The function V_Recharge is activated in physical addressing mode, so as to modify the content of the table LPT in order to cause a physical page number PPN to correspond there to the logical page number LPN. The physical addressing mode consists in directly using the address 112 without passing via the mechanism in FIG. 1. A step 69 then tests whether the return of the function V_Recharge occurs successfully, i.e. whether the page numbered PPN is present in physical memory. The processor CPU can then access the physical page numbered PPN in step 61. Otherwise the case of a second-level page fault arises. The processor CPU then causes the activation of a software function named p_obtain in step 70. It is possible to activate the function p_obtain in virtual addressing mode, so as to modify the content of the table PPT in order to cause a physical page number PPN to correspond to a logical page number LPN. The virtual addressing mode simplifies an implementation of complex algorithms, which are outside the scope of the present invention. The function p_obtain activates, in step 71, a function named p_enter in virtual addressing mode. The function p_obtain also comprises other steps not illustrated, since they are of no direct use in understanding the invention. For example, following the release of a physical page numbered PPN in order to allocate its location to the logical page numbered LPN, all the inputs of the table 110 that formerly established a correlation with that physical page number PPN, are invalid. It should be noted that only the unpegged physical pages can be released. Following the execution of step 71, the processor CPU can then access the physical page numbered PPN in step 61.

Figure 3B:
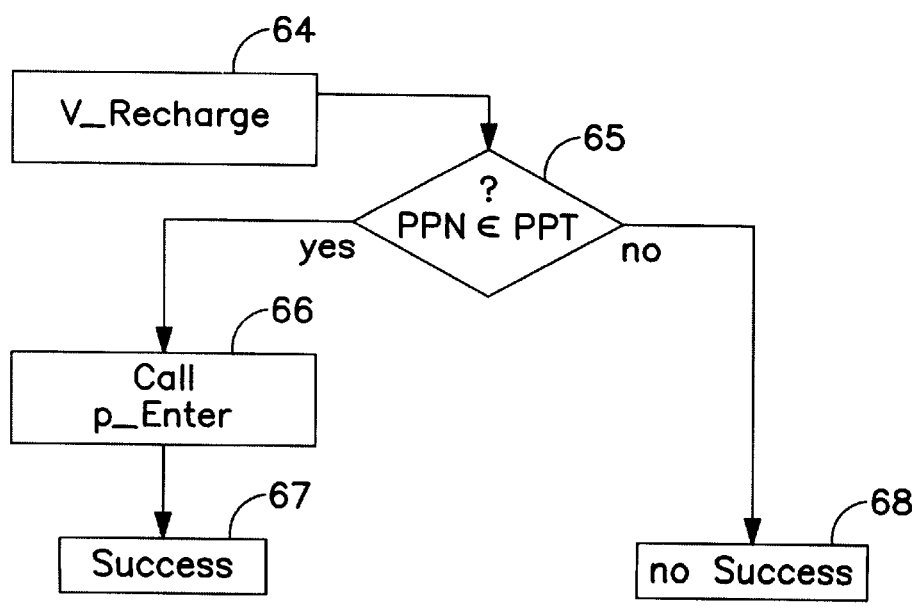

FIG. 3b shows the essential steps in the function V_Recharge for solving the first-level page fault. In step 64 the function V_Recharge scans the table PPT 55. If the function V_Recharge finds (56) in step 65, a physical page number PPN, which references the logical page number LPN that was missing in the table LPT, the function V_Recharge activates in physical addressing mode the function p_enter in step 66. Otherwise the function V_Recharge stops at step 68, returning a failure signal to denote an absence of success in accessing the table PPT 55. Following the execution of step 66, the function V_Recharge stops at step 67, returning a success signal in order to signify that a correlation has been established in the table LPT for the logical page number LPN.

Figure 3C:
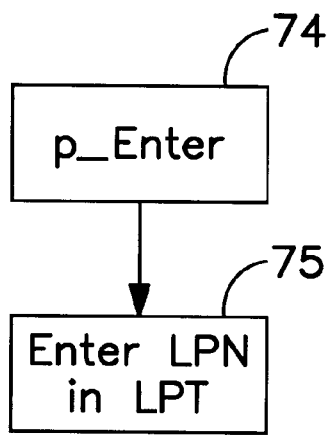

FIG. 3c explains the essential actions of the function p_enter that starts at step 74. In step 75 the logical page number LPN resulting from the steps preceding step 74 is introduced (57) in the table LPT 110 with (58) the corresponding physical page number PPN.

Figure 4A:
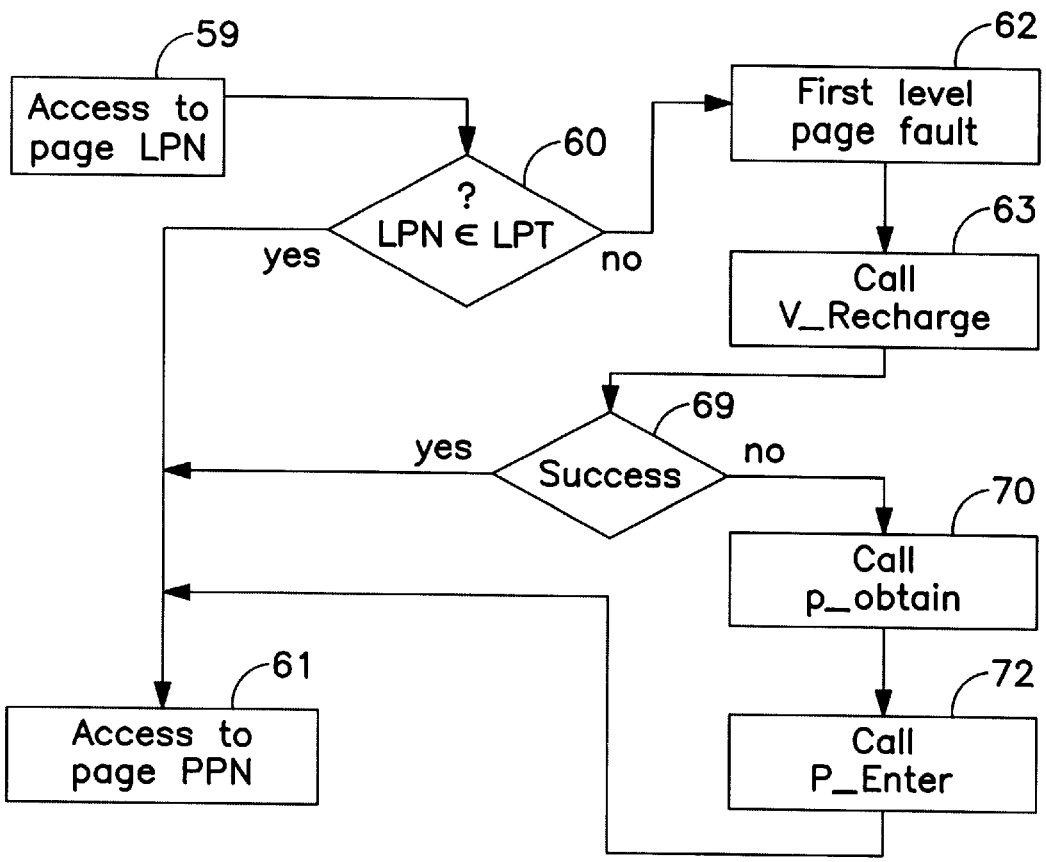
FIG. 4 shows modifications of FIG. 3, according to the invention.
Figure 4B:
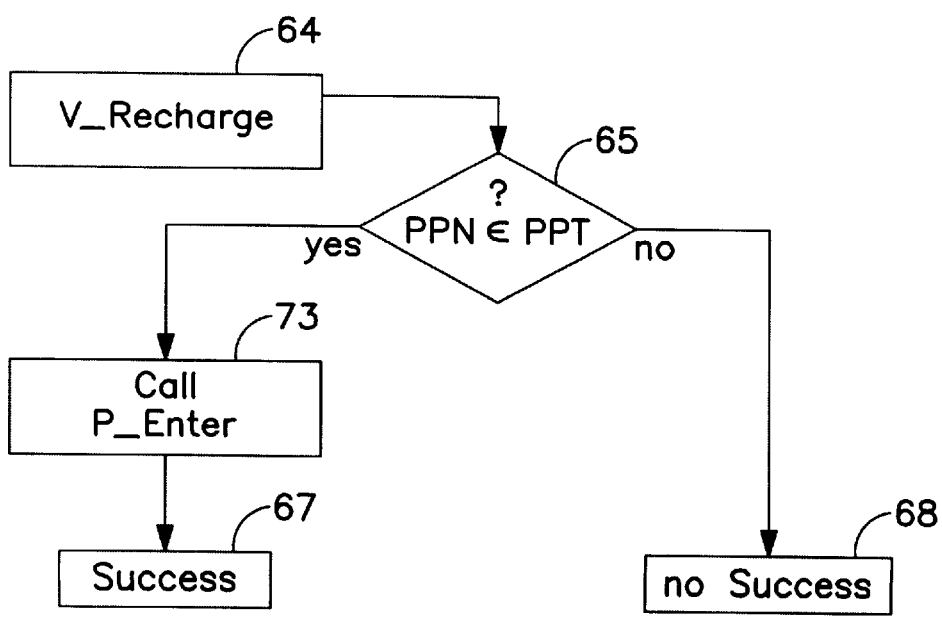

FIGS. 4a and 4b are similar to FIGS. 3a and 3b respectively, except that steps 71 and 66 are replaced by steps 72 and 73 respectively, which activate a function P_Enter that is different from the function p_enter, distinguished in the description with the aid of capital letters.

Figure 4C:
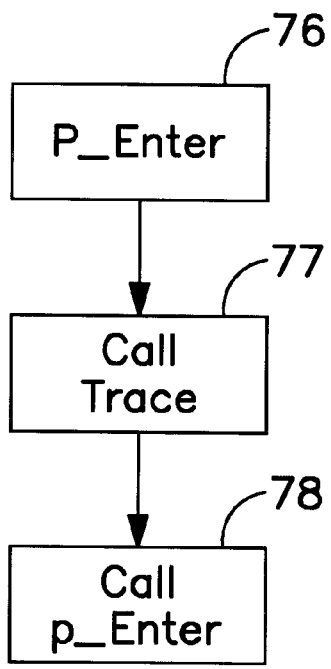

FIG. 4c explains the essential actions of the function P_Enter, which starts at step 76. In step 77 the function P_Enter activates a Trace function, explained later in the description. In step 78 the function P_Enter activates the original function p_enter. This embodiment is the one that reconciles the ability of the trace method to adapt well to any type of machine, while interfering as little as possible with the operation of the machine to which it is applied. Indeed, it would be possible to envisage creating a particular process to perform the tracing. However, this process would be likely to interfere with measurements by the resources, in particular in terms of memory and processors allocated thereto. It would also be possible to envisage using a hardware device that would spy on memory accesses, such as a specific bus controller. However, this device would necessarily be linked with the hardware constitution of the machine for which it was designed. Here, in contrast, each execution of the trace function forms an integral part of the task, and makes an impression of the memory accesses thereof.

Figure 5:
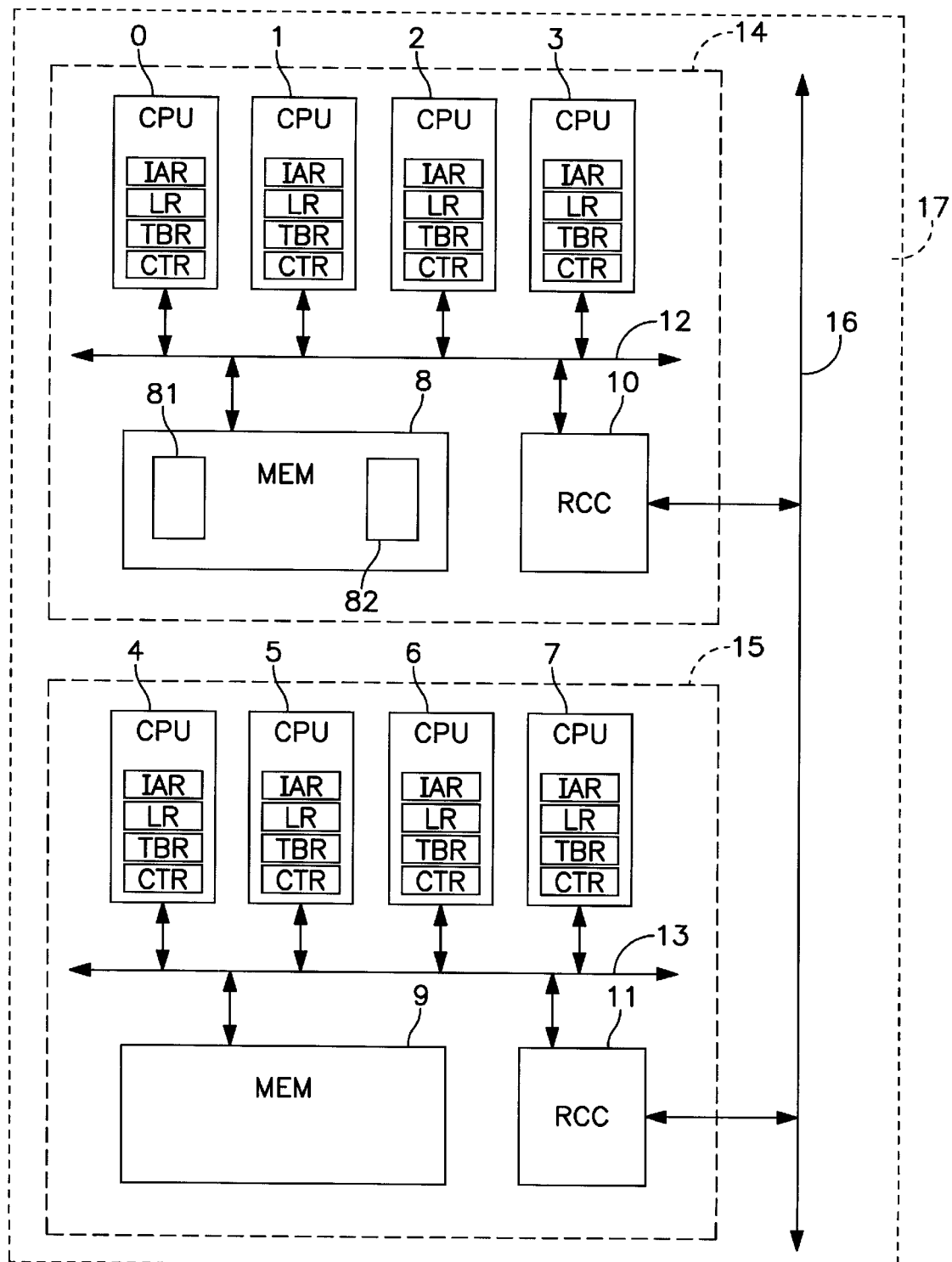
FIG. 5 shows an example of an information processing machine for implementing the invention.

FIG. 5 shows an example of an information processing machine 17 comprising several modules 14, 15 connected by a bus 16 such that the same operating system runs on all the modules. The module 14 comprises several processors 0, 1, 2, 3, the module 15 comprises several processors 4, 5, 6, 7, these processors being named subsequently CPU. Each processor CPU contains several internal registers, which we shall subsequently describe as an instruction address register IAR, a link register LR, a connect register CTR and a time base register TBR. The registers IAR, LR and CTR are of use to the processor CPU to which they belong in performing sequences of instructions during the execution of a task Th submitted to the processor CPU. The register TBR is of use to the processor CPU to which it belongs for dating, if necessary, an event arising in the course of execution. Each module 14, 15 comprises a physical memory unit 8, 9 and a remote cache coherency controller RCC 10, 11, which communicates via the bus 16 with the other module or modules.

A processor CPU of the module 14 can, using a bus 12, make direct local accesses to the physical memory unit 8 and direct remote accesses to the physical memory unit 9 via the controllers 10, 11 and the bus 16. Similarly, a processor CPU of any other module 15 can, using a bus 13, make direct local accesses to the physical memory unit 9 and direct remote accesses to the physical memory unit 8 via the controllers 11, 10 and the bus 16. All the memory units 8, 9 together constitute the physical memory of the machine managed by a single operating system, common to all the modules. Remote accesses being longer than local accesses, the machine is of the NUMA type, i.e. with non-uniform memory access.

Each processor has an identifier that distinguishes it from the other processors, this identifier is assigned to it as a function of the module on which it is located, for example a number from 0 to 3 for the module 14, a number from 4 to 7 for the module 15, etc. The number of a physical page distinguishes the module on which it is resident, for example the hexadecimal numbers 0 to FFFF on the module 14 if the memory 8 contains 256 megabytes, the numbers 10000 to 2FFFF on the module 15 if the memory 9 contains 512 megabytes, and so on.

The machine 17 comprises different means for performing the steps illustrated in FIGS. 3 and 4. Steps 59 to 62 are performed by hardware means such as logical gate circuits and firmware means. These means are found in every processor CPU of the machine. The correlation tables 110 and 55 are found in the physical memory 8, 9 of the machine. The correlation table 110 is directly accessible by each processor CPU in physical addressing mode. The correlation table 110 is resident in a single module or distributed within several modules. Step 63 calls on software means, i.e. means constituted by sequences of instructions coded in the form of text resident in physical memory 8, 9 of the machine, to which each processor CPU has access in physical addressing mode since this step triggers a direct intervention on the correlation table 110, which cannot therefore be used at that time in virtual addressing mode. Steps 64 to 68 are therefore performed by software means using the physical addressing mode. Step 70 calls on other software means using the virtual addressing mode. The virtual addressing mode facilitates implementation of complex functions, scanning of lists, access to mass memories by inputs/outputs, etc. It is made possible by the absence of direct intervention on the members of the virtual memory mechanism as described with reference to FIG. 1. Steps 74 and 75 are performed by software means using the physical addressing mode or using the virtual addressing mode in a zone of addressing space where logical page numbers LPN and physical page numbers PPN are identical and pegged in a table PPT.

The means in steps 63 to 75 are not constituted solely of lines of code resident in the machine's memory but also circuits, resident in each processor, for interpreting these lines of code and triggering sequences of actions that result from this interpretation. This is well known from the state of the art.

FIG. 6 shows a table consisting of several columns. The first column contains a succession of dates expressed in hours, minutes, seconds and nanoseconds. Each date corresponds to a trace detailed in the next columns, made at the date documented on the same line in the first column. The date allows correlations to be made with results obtained elsewhere.

The second column contains a process name Pnom. This process name makes it possible to recognise macroscopically the process that has made a memory access from which the trace results. This column is optional.

The third column contains an identifier Pid of the process mentioned above, this identifier is generally assigned automatically by the operating system, for each process created.

The fourth column contains a task identifier Tid executed for the process identified in the third column, particularly responsible for the trace documented.

The fifth column contains an identifier of the processor CPU that was executing the task referenced in the fourth column on the date when the trace was prepared. Knowing this identifier makes it possible to determine the module on which the processor CPU is located. For example, a value from zero to three indicates that the processor is located on the module 14, a value from four to seven indicates that the processor is located on the module 15. By adding an additional module with six processors, a value comprised between eight and thirteen indicates that the processor is located on this additional module. By using the fifth and fourth column together it is possible to determine how the tasks are spread over the modules.

The sixth column contains a signal IT, a value Y of which signifies an interrupt intervention. Otherwise, the value is N. A value Y indicates that the information concerning the task identified in the fourth column is not significant. Indeed, the instructions executed at the time of the page fault are not strictly speaking those of the task but those of an interrupt manager.

The seventh column contains the value of the register LR, coded in hexadecimal, of the processor CPU referenced in the fifth column on the same line. The value of the register LR is the address of the instruction that follows a function call containing the current instruction executed by the processor CPU, in a code sequence.

The eighth column contains the value of the register IAR, coded in hexadecimal, of the processor CPU referenced in the fifth column on the same line. The value of the register IAR is the address of the current instruction executed by the processor CPU, in the code sequence. The values of the registers LR and IAR make it possible to deduce, for example, whether the task Tid is executed in core mode, i.e. that, following a system call, it is the code sequence of a core function that is executed and not a code sequence specific to the task Tid in itself. These values therefore make it possible to establish a relationship between a page allocated to the task Tid and its origin as a logical entity, code specific to the task or code specific to the core. In a method of optimising the machine, the values obtained in the seventh and eighth column, in comparison with those obtained in the other columns, make it possible to decide, for example, to reorganise the code.

The ninth column contains the effective address EA, coded in hexadecimal, accessed by the task referenced in the fourth column on the same line. If each register of the table of segments 106 is intended to contain a particular type of segment, data, text, shared library, etc., it is possible to deduce from the field STE the region of the virtual addressing space to which the trace relates. A segment of text that concerns executable code is generally accessed in read mode. Knowing the type of segment then makes it possible to envisage various strategies for increasing the performance of the machine, such as a replication or migration of pages in the module containing the processor CPU referenced in the fifth column on the same line. If many hot pages, i.e. pages frequently accessed, are detected in a segment of text, reproducing the pages in different modules avoids the latencies caused by access to the physical memory of a remote module. This is possible in so far as this segment of text is accessed solely in read mode. If many hot pages are detected in a segment of data for the execution of a task and these pages are physically spread over several modules, a migration of pages and of the task itself to a single module avoids the latencies caused by access to the physical memory of a remote module. This solution is advantageous since a segment of data is accessible in both read and write mode. If several tasks, spread over different modules, use the same shared library, it is useful to reproduce the pages associated with this library on each of the modules concerned.

The field SPRA makes it possible to deduce more precisely what address is being accessed in the virtual addressing space. As it is identical to the value of the field PRA in the physical addressing space, it makes it possible to know whether one is at the beginning or end of, or inside a physical page.

The tenth column contains the physical page number PPN, coded in hexadecimal, corresponding to the effective address referenced in the ninth column on the same line. Knowing this page number makes it possible to deduce the module in which the physical page is resident. For example, a capacity of two hundred and fifty-six megabytes for the memory unit 8 makes it possible to reference thereto physical page numbers PPN going from 0 to FFFF; the physical pages referenced in this way are then resident in the module 14. A capacity of five hundred and twelve megabytes for the memory unit 9 makes it possible to reference thereto physical page numbers PPN going from 10000 to 2FFFF; the physical pages referenced in this way are then resident in the module 15. By adding an additional module connected to the bus 16, it is possible to reference thereto numbers PPN above 30000 to a value dependent on the capacity of the memory unit of this module, and so on until FFFFF, according to the number of modules added and the capacity of their respective memory unit.

The eleventh column contains the segment identifier SD, coded in hexadecimal, corresponding to the effective address referenced in the ninth column on the same line. The value of this identifier, concatenated to the value of the field SPN, provides a logical page number LPN. By attaching the logical page number LPN to the task identifier Tid obtained in the fourth column, one can be sure of the uniqueness of a virtual page number. It is therefore possible to recognise the logical page numbers used by several tasks.

The twelfth column contains the value of the indicator Pin assigned to the physical page referenced on the same line in the tenth column. A status Y generally corresponds to pages pegged in the memory. If an unremovable physical page is resident in a module different from that where the processor executing the task Tid is located, the time to access that page will be longer than if the processor were located on the same module. Too frequent a status Y for the indicator Pin is therefore prejudicial to the performance of the machine.

Thus, by duplicating memory pages often accessed but only in read mode, in several modules, by causing pages to migrate to the module where they are most frequently accessed, or by reorganising the code so as to facilitate execution thereof, it is possible to optimise the operation of the machine.

Figure 7:
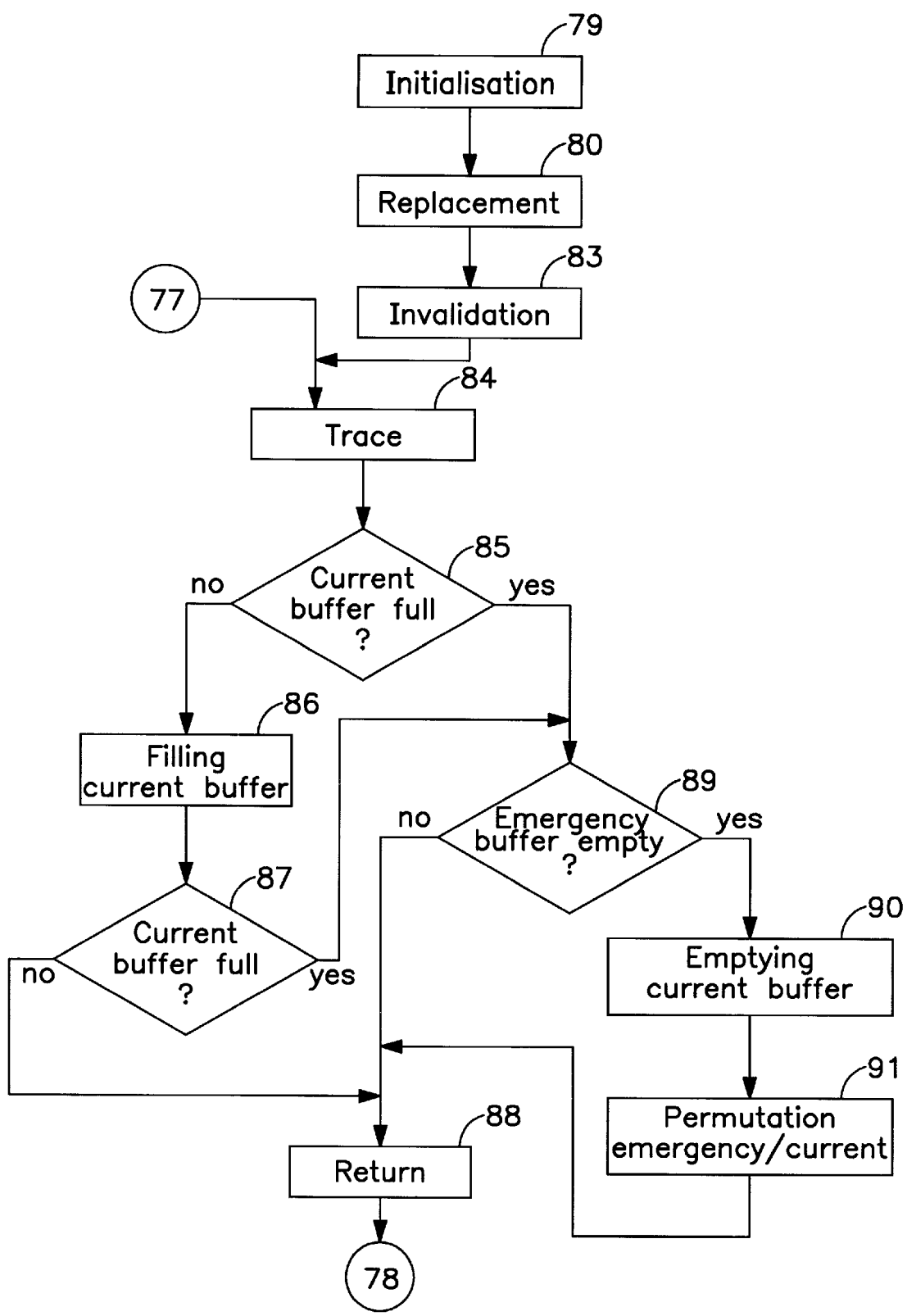
FIG. 7 shows other steps in the method in accordance with the machine.

FIG. 7 shows other steps in the method in accordance with the machine. The method starts up with a preparation phase constituted by steps 79, 80 and 83. A zone is reserved in the memory 8, 9 of the machine in order to record temporarily the data documented in the table in FIG. 6 as they appear. Advantageously, the memory zone of the machine is divided into two buffers 81, 82 for each processor CPU. These buffers are filled and emptied alternately for said processor CPU. The assignment of a pair of buffers to each processor CPU of the machine 17 avoids concurrent accesses to these buffers by distinct processors. In this way their content remains coherent without using locks.

In the initialisation step 79, one of the buffers, for example the buffer 81, is denoted the current buffer and the other buffer, in this case the buffer 82, is denoted the emergency buffer. The current buffer is the one to which the trace data are written as they are recorded. The emergency buffer is the one intended to become the new current buffer when the present current buffer is full.

In the replacement step 80, steps 66 and 71 are replaced respectively by steps 73 and 72. In this way, each activation of step 77 causes an activation of step 84, which starts the trace function.

In the invalidation step 83, all the inputs of the table 110 are invalidated. In this way, accesses to logical pages, the number of which already had a correlation to a physical page number before the trace process was launched, are nevertheless recorded. One is therefore sure of preserving a trace of all the types of access to the physical memory of the machine.

To facilitate its implementation, the preparation phase can be performed in virtual addressing mode.

In step 85, the status of the current buffer is tested. If the current buffer is full, the status of the emergency buffer is tested in step 89. If the current buffer is not full, it is filled in step 86 with the data mentioned with reference to FIG. 6. The current buffer is accessed in virtual addressing mode if step 77 results from an activation of step 72. The current buffer is accessed in physical addressing mode if step 77 results from activating step 73.

In step 87, the status of the current buffer is tested. If the current buffer is full, the status of the emergency buffer is tested in step 89. If the current buffer is not full, the trace function ends at step 88, and returns to step 78.

In step 89, if the emergency buffer is not empty, the trace function ends at step 88, and returns to step 78. The current buffer remains full and other page faults may bring a positive result to the test in step 85. If the emergency buffer is empty, the emptying of the current buffer is activated in step 90. The virtual addressing mode facilitates the emptying of the memory zone and the transfer of its content to mass memories such as disks.

In step 91, a permutation in which the emergency buffer, then empty, becomes the current buffer for subsequent filling, makes it possible to denote the old buffer as emergency buffer, which in turn becomes available for subsequent filling once it has been emptied, the trace function ends at step 88, and returns to step 78.

In so far as the trace function is prepared in virtual addressing mode so as to facilitate coding on the machine, the code obtained should be aligned at the start of a virtual page and should fit as a whole on one virtual page. Indeed, this code is then executed in physical addressing mode for reasons explained previously and it should not exceed the size of one physical page.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A method for controlling memory access on a machine with non-uniform memory access distributed over several modules, each module comprising one or more processors CPU for executing tasks on a virtual or physical addressing space by means of effective addresses generating logical page numbers to which it is possible to make physical page numbers correspond in the memory by means of a correlation table, the generation of a logical page number causing a task to have a first-level page-fault type exception when the logical page number is absent from the correlation table, comprising a first step of activating, following each first-level page-fault type exception, a function (Trace), which records the value of an effective address that has generated the logical page number that has caused the exception, a date when the exception is caused, an identifier of the task using the effective address, an identifier of the processor executing the task, and a physical page number corresponding to the logical page number that has caused the exception; and wherein the activating of the function (Trace) is called from within the task having the exception and executed by the one or more processors.

2. The method for controlling memory access on a machine with non-uniform memory access according to claim 1, further comprising invalidating all inputs in the correlation table upon start up of the machine.

3. The method for controlling memory access on a machine with non-uniform memory access according to claim 2, wherein the function (Trace) simultaneously records an indicator (Pin) for showing whether the physical page is pegged or not pegged.

4. The method according to claim 3, wherein the method is used for duplicating pages or causing them to migrate, so as to optimize the operation of the machine to which it is applied.

5. The method according to claim 2, wherein the method is used for duplicating pages or causing them to migrate, so as to optimize the operation of the machine to which it is applied.

6. The method for controlling memory access on a machine with non-uniform memory access according to claim 1, wherein the function (Trace) simultaneously records an indicator (Pin) for showing whether the physical page is pegged or not pegged.

7. The method according to claim 6, wherein the method is used for duplicating pages or causing them to migrate, so as to optimize the operation of the machine to which it is applied.

8. The method for controlling memory access on a machine with non-uniform memory access according to claim 1, further comprising a second step provided for effecting a new correlation in the table, and replacing said second step with said first step following a first-level page fault.

9. The method according to claim 8, wherein the method is used for duplicating pages or causing them to migrate, so as to optimize the operation of the machine to which it is applied.

10. The method for controlling memory access on a machine with non-uniform memory access according to claim 1 further comprising saving traced data in a memory zone that can be accessed irrespectively in virtual addressing mode or in physical addressing mode.

11. The method according to claim 10, wherein the method is used for duplicating pages or causing them to migrate, so as to optimize the operation of the machine to which it is applied.

12. The method for controlling memory access on a machine with non-uniform memory access according to claim 1, wherein the code of the function (Trace) and the data necessary thereto, does not exceed the size of one virtual page and in that this code is aligned on a start of virtual page.

13. The method according to claim 12, wherein the method is used for duplicating pages or causing them to migrate, so as to optimize the operation of the machine to which it is applied.

14. The method according to claim 1, wherein the method is used for duplicating pages or causing them to migrate, so as to optimize the operation of the machine to which it is applied.

15. The method for controlling memory access on a machine with non-uniform memory access according to claim 1, further comprising:

locating the logical page number in said effective address;

searching the correlation table for the logical page number; and performing the following steps if the logical page number is not found in said correlation table:

(a) deriving a physical page number in said effective address;

(b) searching a second correlation table for said physical page number;

(c) determining whether said second correlation table stores the logical page number in relation to said physical page number; and (d) modifying the correlation table to store said physical page number in association with the logical page number based on an outcome of said determining step.

16. An apparatus of r controlling memory access on a machine with non-uniform memory access distributed over several modules, each module comprising one or more processors CPU for executing tasks on a virtual or physical addressing space by means of effective address generating logical page numbers to which it is possible to make physical page numbers correspond in the memory by means of a correlation table, the generation of a logical page number causing a task to have a first-level page-fault type exception when the logical page number is absent from the correlation table, the machine further comprising:

first means for activating a function that introduces the logical page number with a correlation to a physical page number in the correlation table following the exception caused by an absence of valid input containing the logical page number in the correlation table, and second means for replacing the first means by third means for activating a function (Trace); and wherein the activating of the function (Trace) is called from within the task having the exception and executed by the one or more processors.

17. The apparatus according to claim 16, further comprising fourth means for invalidating the inputs of the correlation table before said first means are replaced.

18. The apparatus according to claim 16, further comprising at least two buffers for temporarily saving the traced data, one buffer being alternately emptied to a mass memory while the other buffer is filled with the results of the trace function.

19. The apparatus according to claim 18, wherein a different pair of buffers is assigned to each processor to avoid concurrent accesses to the buffers while they are being emptied and filled.

20. The apparatus for controlling memory access on a machine with non-uniform memory access according to claim 16, further comprising:

means for locating the logical page number in said effective address;

means for searching the correlation table for the logical page number; and means for performing the following steps if the logical page number is not found in said correlation table:
  (a) deriving a physical page number in said effective address;
  (b) searching a second correlation table for said physical page number;
  (c) determining whether said second correlation table stores the logical page number in relation to said physical page number; and
  (d) modifying the correlation table to store said physical page number in association with the logical page number based on an outcome of said determining step.

* * * * *

UNITED STATES PATENT AND TRADEMARK OFFICE
CERTIFICATE OF CORRECTION

PATENT NO. : 6,473,848 B2
DATED : October 29, 2002
INVENTOR(S) : Bouraoui et al.

It is certified that error appears in the above-identified patent and that said Letters Patent is hereby corrected as shown below:

<u>Title page,</u>
Item [57], ABSTRACT,
Line 6, delete "tale" and substitute with -- table --;

<u>Column 12,</u>
Line 52, delete "of r" and substitute with -- for --;

Signed and Sealed this

Fourth Day of March, 2003

JAMES E. ROGAN
*Director of the United States Patent and Trademark Office*